United States Patent
Saltsidis et al.

(10) Patent No.: US 10,063,432 B2
(45) Date of Patent: Aug. 28, 2018

(54) METHOD AND SYSTEM OF SUPPORTING SERVICE CHAINING IN A DATA NETWORK

(71) Applicant: Telefonaktiebolaget LM Ericsson (publ), Stockholm (SE)

(72) Inventors: Panagiotis Saltsidis, Stockholm (SE); David Ian Allan, San Jose, CA (US); János Farkas, Kecskemét (HU); Martin Julien, Stockholm (SE); Laurent Marchand, Montreal (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 237 days.

(21) Appl. No.: 15/304,477

(22) PCT Filed: Nov. 26, 2013

(86) PCT No.: PCT/SE2013/051389
§ 371 (c)(1),
(2) Date: Oct. 14, 2016

(87) PCT Pub. No.: WO2015/080634
PCT Pub. Date: Jun. 4, 2015

(65) Prior Publication Data
US 2017/0149632 A1    May 25, 2017

(51) Int. Cl.
*H04L 12/24* (2006.01)
*H04L 12/46* (2006.01)
*H04L 12/721* (2013.01)

(52) U.S. Cl.
CPC ...... *H04L 41/5054* (2013.01); *H04L 12/4633* (2013.01); *H04L 12/4666* (2013.01);
(Continued)

(58) Field of Classification Search
CPC ............. H04L 12/4633; H04L 12/4666; H04L 2212/00; H04L 41/0668; H04L 41/5054; H04L 45/66
(Continued)

(56) References Cited

U.S. PATENT DOCUMENTS 7,995,483 B1 * 8/2011 Bayar ................. H04L 41/0893
370/241.1
2009/0252179 A1 * 10/2009 Sultan ................. H04L 12/4625
370/470
(Continued)

OTHER PUBLICATIONS

International Search Report and Written Opinion for Application No. PCT/SE2013/051389, dated May 6, 2014, 9 pages.

*Primary Examiner* — Stephen J Clawson
(74) *Attorney, Agent, or Firm* — Sage Patent Group

(57) ABSTRACT

A method of supporting service chaining at a network device of a data network is disclosed. The data network offers a set of services associated with a set of network devices, where subscribers of the data network are served by chains of one or more services. The method starts upon receiving a frame, and the network device selects a chain of one or more services for the frame to be processed by the data network. The network device encapsulates the frame with a reflected frame message (RFM) header, the RFM header containing source information associated with the network device, destination information associated with an immediate next service for the frame to be processed, an operation code indicating the frame being an RFM frame. Then the network device sends the encapsulated frame out of the network device according to the destination information of the encapsulated frame.

37 Claims, 10 Drawing Sheets

(52) U.S. Cl.
CPC .......... *H04L 41/0668* (2013.01); *H04L 45/66* (2013.01); *H04L 2212/00* (2013.01)

(58) Field of Classification Search
USPC ........................................................ 370/228
See application file for complete search history.

(56) References Cited

U.S. PATENT DOCUMENTS

| | | |
|---|---|---|
| 2010/0080226 A1 | 4/2010 | Khalid et al. |
| 2011/0055845 A1 | 3/2011 | Nandagopal et al. |
| 2013/0058215 A1* | 3/2013 | Koponen ............ H04L 12/4633 370/241 |
| 2013/0272305 A1 | 10/2013 | Lefebvre et al. |

* cited by examiner

METHOD AND SYSTEM OF SUPPORTING SERVICE CHAINING IN A DATA NETWORK

CROSS-REFERENCE TO RELATED APPLICATIONS

This application is a National stage of International Application No. PCT/SE2013/051389, filed Nov. 26, 2013, which is hereby incorporated by reference.

FIELD OF INVENTION

The embodiments of the invention are related to the field of networking. More specifically, the embodiments of the invention relate to a method and system of supporting service chaining in a data network.

BACKGROUND

Operators use different middlebox services or appliances, called inline services, such as deep packet inspection (DPI), logging/metering/charging/advanced charging, firewall (FW), virus scanning (VS), intrusion detection and prevention (IDP), network address translation (NAT), etc., to manage subscribers' traffic. These services have high requirements on throughput and packet inspection capabilities. They can be transparent or nontransparent to the end users. Inline services can be hosted in dedicated physical hardware, or in virtual machines.

Service chaining is required if the traffic needs to go through more than one inline service in a specific order. Moreover, if more than one chain of services is possible, then the operator needs to configure the networking infrastructure to direct the right traffic through the right inline service path. Further, a given chain type may be repeatedly implemented in multiple chains for scaling purposes. In this specification, traffic steering refers to leading the traffic through the right inline service path through selecting a specific instance of a chain of service within the network.

There have been some efforts to determine how to steer traffic to provide inline service chaining. The mechanisms developed through those efforts generally involve computation intense processing through network devices hosting the chains of services.

FIG. 1 illustrates an example of inline service chaining for a data network. In network 100, it is assumed that regular residential traffic flows from resident 152 needs deep packet inspection (DPI) service, DPI 191, and network address translation (NAT) service, NAT 197. Premium residential traffic flows from resident 152 receives the same services in addition to firewall (FW) service, FW 195, and virtual scanning (VS) service, VS 193. Enterprise traffic flows from office 154 do not require service NAT 197, but they do need services DPI 191, FW 195 and VS 193. In this example, all traffic flows go through DPI 191 first at task box 1, and then the traffic flows go back to bounder network gateway (BNG) 102. At task box 2, BNG 102 directs the traffic flows to respective right next hop services such as VS 193, FW 195, and NAT 197 depending on the service sequences of the traffic flows.

The subscriber session authentication, authorization, and accounting (AAA) driven policy can define the first hop service at AAA 112 associated with BNG 102; however, this subscriber context information is no longer associated with the returned traffic from the DPI 191 after task box 1. Hence, determining the next service for a specific flow becomes non-trivial.

One approach to providing services to a network is to use a single box that runs multiple services. This approach consolidates all inline services into a single networking box (e.g., a router or a gateway) and hence avoids the need of dealing with inline service chaining configuration of the middleboxes. The operator adds new services by adding additional service cards to the single networking box.

The single box approach cannot satisfy the openness requirement as it is hard to integrate existing third party service appliances. This solution also suffers from scalability issues as the number of services and the aggregated bandwidth is limited by the capacity of the single box. Also, the number of slots in the chassis of the single box is limited.

Instead of a single box, newer approaches distribute services across multiple network devices within the network. FIG. 2 illustrates another example of inline service chaining for a data network. Network 200 contains ingress nodes IN1 and IN2 at references 252 and 254 respectively, and it also contains egress nodes OUT1 and OUT2 at references 256 and 258, and regular network nodes N1-N4 at references 202-208 respectively. All ingress/egress and regular network nodes are network devices. One difference between ingress/egress nodes (often referred to as edge nodes) and regular network nodes is that ingress/egress nodes receives and transmit frames in and out of network 200.

In network 200, services S0-S2 (which may be DPI, VS, FW, NAT services illustrated in FIG. 1 or any other services) at references 295-297 are distributed to network devices N1, N3, and N4 at references 202, 206, and 208 respectively. Note the distributing of services to network devices may be in a variety of forms. The services may be physically residing at the network devices so that traffic is forwarded to a particular network device to be served by a particular service. The services may be only virtually associated with the network devices and traffic is forwarded to a virtual port associated with a network device for a particular service. Network manager 250 may manage network 200 thus coordinate traffic (frames) through the network to be served by desired chains of services in one embodiment. In another embodiment, individual network devices determine how to get traffic served by desired chains of services.

In general, the network supports two main functions for service chaining: One is an analyzing function used to analyze incoming traffic and identify the frames that need to be processed by a particular service chain. This function is also referred to as classification. The other is a sequencing function used to encode an ordered list of services (sometimes referred to as appliances or applications, or virtual appliance or applications when virtual hosts runs the appliances or applications) that need to be visited into information that can be used by traffic forwarding function within domains upon which the service resides. The sequencing function is also referred to as chain forwarding functions.

Current solutions for the distributed inline service chaining either require physical construction of unique service chains resulting in unreasonable cost and inefficiency. Alternatively, a more contemporary approach is to apply a heavy processing functionality of the analyzer function on every step of the service chains path while having a light processing functionality of the sequencing function that go little beyond identifying the next service in the chain (for example, as applied in OpenFlow protocol). This kind of approach carries a very complex packet processing at each hop of incoming frames, and it is expensive and hard to scale too. Thus, more efficient mechanisms to support service chaining are desirable.

SUMMARY

A method of supporting service chaining at a network device containing one or more service processing entities of a data network is disclosed. The data network offers a set of services associated with a set of network devices, where subscribers of the data network are served by chains of one or more services. The method starts upon receiving a frame at a service processing entity serving as a traffic classifier and the network device selects a chain of one or more services for the frame to be processed by the data network. The service processing entity within the network device encapsulates the frame with a reflected frame message (RFM) header, the RFM header containing source information associated with the service processing entity, destination information associated with an immediate next appliance providing an immediate next service for the frame to be processed, and an operation code indicating the frame being an RFM frame. Then the network device sends the encapsulated frame to an appliance according to the destination information of the encapsulated frame.

While the method above discloses sending the encapsulated frame, another method is disclosed for receiving the encapsulated frame at a service processing entity serving as a traffic sequencer. The method starts upon receiving a frame at the service processing entity, and the network device determines that destination information of the frame identifies an appliance associated with the service processing entity, where the appliance provides a service of the set of services. The network device determines that the frame is a reflected frame message (RFM) frame by examining an operation code of the frame, and it then removes an RFM header of the frame and serves the frame with the service.

A network device for supporting service chaining in a data network is disclosed. The data network offers a set of services associated with a set of network devices, where subscribers of the data network are served by chains of one or more services. The network device contains at least one service interface and one service processor. The service interface is configured to receive frames sourced from subscribers, where a frame is received. The service processor includes a service chain selector configured to select a chain of one or more services for the frame to be processed by the data network, a frame encapsulator configured to encapsulate the frame with a reflected frame message (RFM) header, the RFM header containing source information associated with the service processor, destination information associated with an immediate next appliance providing an immediate next service within the selected chain of one or more services for the frame to be served, and an operation code indicating the frame being an RFM frame, where the encapsulated frame is sent according to the destination information of the encapsulated frame.

While the network device above discloses functions relating to sending the encapsulated frame, the same or a different network device contains functions relating to receiving the encapsulated frame. The service interface is configured to receive frames sourced from subscribers, where a frame is received. The service processor includes a frame decapsulator and a service processing unit. The frame decapsulator is configured to determine that destination information of the frame identifies the appliance associated with the service processor, where the appliance provides a service of the set of services. The frame decapsulator is further configured to determine that the frame is a reflected frame message (RFM) frame by examining an operation code of the frame, and remove an RFM header of the frame. The service processing unit is configured to serve the frame.

A non-transitory machine-readable storage medium has instructions stored therein which when executed by a processor, causes the processor to perform operations for supporting service chaining at a network device containing one or more service processing entities of a data network. The data network offers a set of services associated with a set of appliances, where subscribers of the data network are served by chains of one or more services. The operations start upon receiving a frame at a service processing entity serving as a traffic classifier, the network device selects a chain of one or more services for the frame to be processed by the data network. The service processing entity encapsulates the frame with a reflected frame message (RFM) header, the RFM header containing source information associated with the service processor, destination information associated with an immediate next appliance providing an immediate next service for the frame to be processed, and an operation code indicating the frame being an RFM frame. Then the network device sends the encapsulated frame according to the destination information of the encapsulated frame.

Another non-transitory machine-readable storage medium has instructions stored therein which when executed by a processor, causes the processor to perform operations for supporting service chaining at a network device containing one or more service processing entities of a data network. The data network offers a set of services associated with a set of appliances, where subscribers of the data network are served by chains of one or more services. The operations start upon receiving a frame at a service processing entities serving as a traffic sequencer, and the service processing entity within the network device determines that destination information of the frame identifies an appliance associated with the service processing entity, where the appliance is associated with a service of the set of services. The frame service processor determines that the frame is a reflected frame message (RFM) frame by examining an operation code of the frame, and it then removes an RFM header of the frame and serves the frame with the service.

Embodiments of the invention utilize existing protocol suites to enable reuse of the Operations, Administration, and Maintenance (OAM) architectural mode in a data network, thus reduce cost of supporting service chaining and make service chaining more efficient.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this specification are not necessarily to the same embodiment, and such references mean at least one. Further, when a particular feature, structure, or characteristic is described in connection with an embodiment, it is submitted that it is within the knowledge of one skilled in the art to affect such feature, structure, or characteristic in connection with other embodiments whether or not explicitly described.

DETAILED DESCRIPTION

Figure 1:
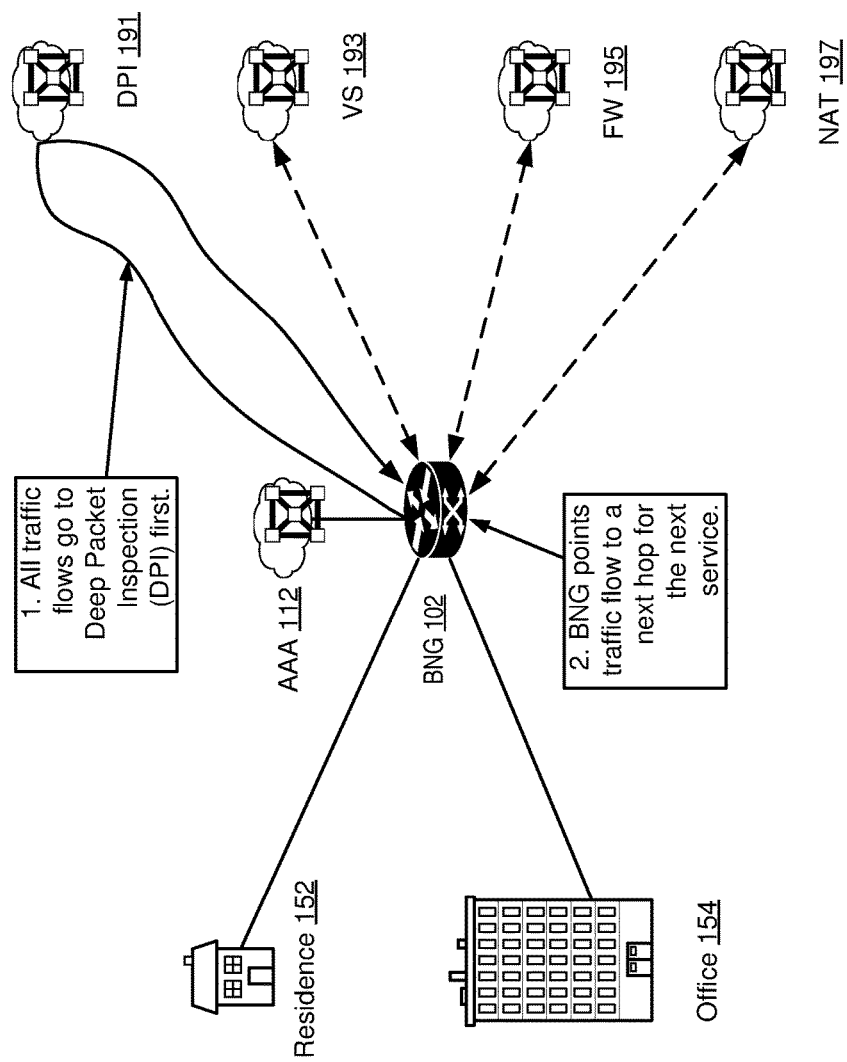
FIG. 1 illustrates an example of inline service chaining for a data network.

In the following description, numerous specific details are set forth. However, it is understood that embodiments of the invention may be practiced without these specific details. In other instances, well-known circuits, structures and techniques have not been shown in detail in order not to obscure the understanding of this description.

It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other. A "set," as used herein refers to any positive whole number of items including one item.

Terms

The following terms may be used in the description. Note the while the terms are explained herein for clarity of discussion, some of these and other related terms have been standardized in IEEE Std 802.1Q—2011, "Standard for Local and Metropolitan Area Networks—Media Access Control (MAC) Bridges and Virtual Bridge Local Area Networks," which is incorporated thereof by reference in its entirety.

Appliance: An entity (sometimes virtual) to provide one or more services. An appliance may be associated with one or more network devices.

Data-driven and data-dependent connectivity fault management (DDCFM): Connectivity fault management capabilities to facilitate detecting and isolating data-driven and data-dependent fault in virtual bridged local area network. The protocol is re-utilized for supporting service chaining as discussed herein.

Forward path test (FPT): A test to determine if a data frame that matches the specified filter condition can reach a specific location within a network.

Maintenance association end point (MEP): An actively managed connectivity fault management (CFM) entity, associated with a specific domain service access point (DoSAP) of a service instance, which can generate and receive CFM protocol data units (PDUs) and track any responses. It is an end point of a single maintenance association (MA) and is an end point of a separate maintenance entity for each of the other MEPs in the same MA.

Maintenance domain (MD): The network or the part of the network for which faults in connectivity can be managed. The boundary of a maintenance domain is defined by a set of DoSAPs, each of which can become a point of connectivity to a service instance.

Maintenance domain intermediate point (MIP): A connectivity fault management (CFM) entity consisting of two MIP half functions (MHFs).

MIP Half Function (MHF): A connectivity fault management (CFM) entity, associated with a single maintenance domain (MD), and thus with a single MD level and a set of virtual local area network identifier (VID), that can generate CFM PDUs, but only in response to received CFM PDUs.

Maintenance point (MP): One of either a MEP or a MIP.

Reflected frame message (RFM): A connectivity fault management (CFM) PDU transmitted by a reflection responder in order to perform forward path test.

Reflected frame message (RFM) receiver: A function on a bridge port, an end station, or a test equipment to receive reflected frame messages (RFMs) and pass them to the corresponding, nonstandarized, RFM analyzer.

Reflection responder (RR): An entity that encapsulates and reflects selected data frames from a specific location within a network to a station specified by a destination field of the data frame.

Service processing entity: An entity that processes frames for preparing and/or providing services. A network device may have one or more service processing entities. A service processing entity may be implemented as a service processor.

Type/Length/Value (TLV): A short, variable length encoding of an information element consisting of sequential type, length, and value fields where the type field identifies the type of information, the length field indicates the length of the information field in octets, and the value field contains the information itself. The type value is locally defined and needs to be unique within the protocol defined in this standard.

An electronic device (e.g., an end station, a network device) stores and transmits (internally and/or with other electronic devices over a network) code (composed of software instructions) and data using machine-readable media, such as non-transitory machine-readable media (e.g., machine-readable storage media such as magnetic disks;

optical disks; read only memory; flash memory devices; phase change memory) and transitory machine-readable transmission media (e.g., electrical, optical, acoustical or other form of propagated signals such as carrier waves, infrared signals). In addition, such electronic devices include hardware, such as a set of one or more processors coupled to one or more other components e.g., one or more non-transitory machine-readable storage media (to store code and/or data) and network connections (to transmit code and/or data using propagating signals), as well as user input/output devices (e.g., a keyboard, a touchscreen, and/or a display) in some cases. The coupling of the set of processors and other components is typically through one or more interconnects within the electronic devices (e.g., busses and possibly bridges). Thus, a non-transitory machine-readable medium of a given electronic device typically stores instructions for execution on one or more processors of that electronic device to execute operations of embodiments of the invention as detailed herein below. One or more parts of an embodiment of the invention may be implemented using different combinations of software, firmware, and/or hardware.

As used herein, a network device (e.g., a router or a switch) is a piece of networking equipment, including hardware and software that communicatively interconnects other equipment on the network (e.g., other network devices, end systems). Some network devices are "multiple services network devices" that provide support for multiple networking functions (e.g., routing, bridging, VLAN (virtual LAN) switching, Layer 2 aggregation, session border control, Quality of Service, and/or subscriber management), and/or provide support for multiple application services (e.g., data, voice, and video). Subscriber end systems (e.g., servers, workstations, laptops, netbooks, palm tops, mobile phones, smartphones, multimedia phones, Voice Over Internet Protocol (VOIP) phones, user equipment, terminals, portable media players, GPS units, gaming systems, set-top boxes) access content/services provided over the Internet and/or content/services provided on virtual private networks (VPNs) overlaid on (e.g., tunneled through) the Internet. The content and/or services are typically provided by one or more end systems (e.g., server end systems) belonging to a service or content provider or end systems participating in a peer to peer service, and may include, for example, public webpages (e.g., free content, store fronts, search services), private webpages (e.g., username/password accessed webpages providing email services), and/or corporate networks over VPNs. Typically, subscriber end systems are coupled (e.g., through customer premise equipment coupled to an access network (wired or wirelessly)) to edge network devices, which are coupled (e.g., through one or more core network devices) to other edge network devices, which are coupled to other end systems (e.g., server end systems). A network device is generally identified by its media access control (MAC) address, Internet protocol (IP) address/subnet, network sockets/ports, and/or upper OSI layer identifiers.

Network devices are commonly separated into a control plane and a data plane (sometimes referred to as a forwarding plane or a media plane). In the case that the network device is a router (or is implementing routing functionality), the control plane typically determines how data (e.g., packets) is to be routed (e.g., the next hop for the data and the outgoing port for that data), and the data plane is in charge of forwarding that data. For example, the control plane typically includes one or more routing protocols (e.g., an exterior gateway protocol such as Border Gateway Protocol (BGP) (RFC 4271), Interior Gateway Protocol(s) (IGP) (e.g., Open Shortest Path First (OSPF) (RFC 2328 and 5340), Intermediate System to Intermediate System (IS-IS) (RFC 1142), Routing Information Protocol (RIP) (version 1 RFC 1058, version 2 RFC 2453, and next generation RFC 2080)), Label Distribution Protocol (LDP) (RFC 5036), Resource Reservation Protocol (RSVP) (RFC 2205, 2210, 2211, 2212, as well as RSVP-Traffic Engineering (TE): Extensions to RSVP for LSP Tunnels RFC 3209, Generalized Multi-Protocol Label Switching (GMPLS) Signaling RSVP-TE RFC 3473, RFC 3936, 4495, and 4558)) that communicate with other network devices to exchange routes and select those routes based on one or more routing metrics. In addition, the control plane also typically include ISO layer 2 control protocols such as Rapid Spanning Tree Protocol (RSTP), Multiple Spanning Tree Protocol (MSTP), and SPB (Shortest Path Bridging), which have been standardized by various standard bodies (e.g., SPB has been defined in IEEE Std 802.1aq-2012).

Routes and adjacencies are stored in one or more routing structures (e.g., Routing Information Base (RIB), Label Information Base (LIB), one or more adjacency structures) on the control plane. The control plane programs the data plane with information (e.g., adjacency and route information) based on the routing structure(s). For example, the control plane programs the adjacency and route information into one or more forwarding structures (e.g., Forwarding Information Base (FIB), Label Forwarding Information Base (LFIB), and one or more adjacency structures) on the data plane. The data plane uses these forwarding and adjacency structures when forwarding traffic.

Typically, a network device includes a set of one or more line cards, a set of one or more control cards, and optionally a set of one or more service cards (sometimes referred to as resource cards). These cards are coupled together through one or more interconnect mechanisms (e.g., a first full mesh coupling the line cards and a second full mesh coupling all of the cards). The set of line cards make up the data plane, while the set of control cards provide the control plane and exchange packets with external network devices through the line cards. The set of service cards can provide specialized processing (e.g., Layer 4 to Layer 7 services (e.g., firewall, Internet Protocol Security (IPsec) (RFC 4301 and 4309), Intrusion Detection System (IDS), peer-to-peer (P2P), Voice over IP (VoIP) Session Border Controller, Mobile Wireless Gateways (Gateway General Packet Radio Service (GPRS) Support Node (GGSN), Evolved Packet Core (EPC) Gateway)). By way of example, a service card may be used to terminate IPsec tunnels and execute the attendant authentication and encryption algorithms.

As used herein, a node forwards IP packets on the basis of some of the IP header information in the IP packet; where IP header information includes source IP address, destination IP address, source port, destination port (where "source port" and "destination port" refer herein to protocol ports, as opposed to physical ports of a network device), transport protocol (e.g., user datagram protocol (UDP) (RFC 768, 2460, 2675, 4113, and 5405), Transmission Control Protocol (TCP) (RFC 793 and 1180), and differentiated services (DSCP) values (RFC 2474, 2475, 2597, 2983, 3086, 3140, 3246, 3247, 3260, 4594, 5865, 3289, 3290, and 3317). Nodes are implemented in network devices. A physical node is implemented directly on the network device, whereas a virtual node is a software, and possibly hardware, abstraction implemented on the network device. Thus, multiple virtual nodes may be implemented on a single network device.

A network interface may be physical or virtual; and an interface address is an IP address assigned to a network interface or a MAC address, be it a physical network interface or virtual network interface. A physical network interface is hardware in a network device through which a network connection is made (e.g., wirelessly through a wireless network interface controller (WNIC) or through plugging in a cable to a port connected to a network interface controller (NIC)). Typically, a network device has multiple physical network interfaces. A virtual network interface may be associated with a physical network interface, with another virtual interface, or stand on its own (e.g., a loopback interface, a point to point protocol interface). A network interface (physical or virtual) may be numbered (a network interface with an IP address or a MAC address) or unnumbered (a network interface without an IP address or MAC address). A loopback interface (and its loopback address) is a specific type of virtual network interface (and IP address or MAC address) of a node (physical or virtual) often used for management purposes; where such an IP address is referred to as the nodal loopback address. The IP address(es) or MAC address(es) assigned to the network interface(s) of a network device, are referred to as IP or MAC addresses of that network device; at a more granular level, the IP or MAC address(es) assigned to network interface(s) assigned to a node implemented on a network device, can be referred to as IP addresses of that node.

Some network devices include service/functionality for AAA (authentication, authorization, and accounting) protocols (e.g., RADIUS (Remote Authentication Dial-In User Service), Diameter, and/or TACACS+(Terminal Access Controller Access Control System Plus). AAA can be provided through a client/server model, where the AAA subscriber is implemented on a network device and the AAA server can be implemented either locally on the network device or on a remote end station (e.g., server end station) coupled with the network device. Authentication is the process of identifying and verifying a subscriber. For instance, a subscriber might be identified by a combination of a username and a password or through a unique key. Authorization determines what a subscriber can do after being authenticated, such as gaining access to certain end station information resources (e.g., through the use of access control policies). Accounting is recording user activity. By way of a summary example, subscriber end stations may be coupled (e.g., through an access network) through an edge network device (supporting AAA processing) coupled to core network devices coupled to server end stations of service/content providers. AAA processing is performed to identify the subscriber record for a subscriber. A subscriber record includes a set of attributes (e.g., subscriber name, password, authentication information, access control information, rate-limiting information, policing information) used during processing of that subscriber's traffic. Other services, such as deep packet inspection (DPI) service, network address translation (NAT) service firewall (FW) service, and virtual scanning (VS) service may also be provided in a network for subscribers. As discussed herein below, these services may be performed in sequence thus offers service chain.

Objectives of Optimization in Service Chaining

In servicing chaining, the requirements for traffic steering solution are: efficiency, flexibility, scalability, and openness. With regard to the efficiency requirement, traffic should traverse middleboxes in the sequence specified by the network operators and should not unnecessarily traverse middleboxes. Great capital expenditure (CAPEX) savings could be achieved if traffic could be selectively steered through or steered away (bypassed) from specific services.

With regard to the flexibility requirement, a traffic steering solution should support subscriber, application, and operator specific policies simultaneously, all stemming from a single control point. Adding or removing new services should be easily done by the network operator.

With regard to the scalability requirement, a traffic steering solution should support a large number of rules and scale as the number of subscribers/applications grows. The ability to offer a per-subscriber selection of inline services could potentially lead to the creation of new offerings and hence new ways for operators to monetize their networks.

In addition, with regard to the openness, it should be possible to deploy any type of middlebox in the network. Deployment of the middlebox should be vendor independent in order to avoid vendor lock-in. Further, network operators should be able to leverage their current investment by reusing their existing middleboxes without modifications.

In general, network operators use policy-based routing (PBR) to forward the subscriber traffic towards the right services. They may also use access control lists (ACLs), virtual local area networks (VLANs), or other tunneling techniques to forward the packets to the right place. In some cases, service chaining can be partly performed by the services themselves, leaving less control to the operator over the remaining hops in a service path. In this case, the services must be configured to direct traffic to the next hop in the chain if the service box is not directly connected to the next hop.

Some of the known approaches have been summarized in the background section. In general, the known approaches have drawbacks for supporting service chaining. Since the existing solutions have not met the requirements, new solutions are needed. Data driven and data dependent fault management (DDCFM) is known in the art as an OAM protocol for supporting fault management. For example, DDCFM has been standardized in IEEE Std 802.1Q—2011, "Standard for Local and Metropolitan Area Networks—Media Access Control (MAC) Bridges and Virtual Bridge Local Area Networks." However, embodiments of the invention utilize a portion of DDCFM protocol to support service chaining.

Overview of Forward Path Test of DDCFM Operations

DDCFM is an extension to connectivity fault management (CFM), which is specified by clauses 17-22 of 802.1Q—2011. It has been utilized in analyzing and isolating fault in a virtual bridged LAN network. The forward path test (FPT) of DDCFM is known in the art, and discussed in detail in Clause 29 of IEEE Std 802.1Q—2011, "Standard for Local and Metropolitan Area Networks—Media Access Control (MAC) Bridges and Virtual Bridge Local Area Networks." The following is an overview of operations relating to the forward path test. The goal of FPT, as utilized as an OAM tool, is to determine whether specified data frames can reach a particular location without error. FPT's reflection responder (RR) reflects identified data frames to a specific target location while the identified data frames can be continued to their original destinations (through a continue option). Thus, the test of a data stream through FPT can be transparent to the application sourcing or sinking that data stream.

Figure 3:
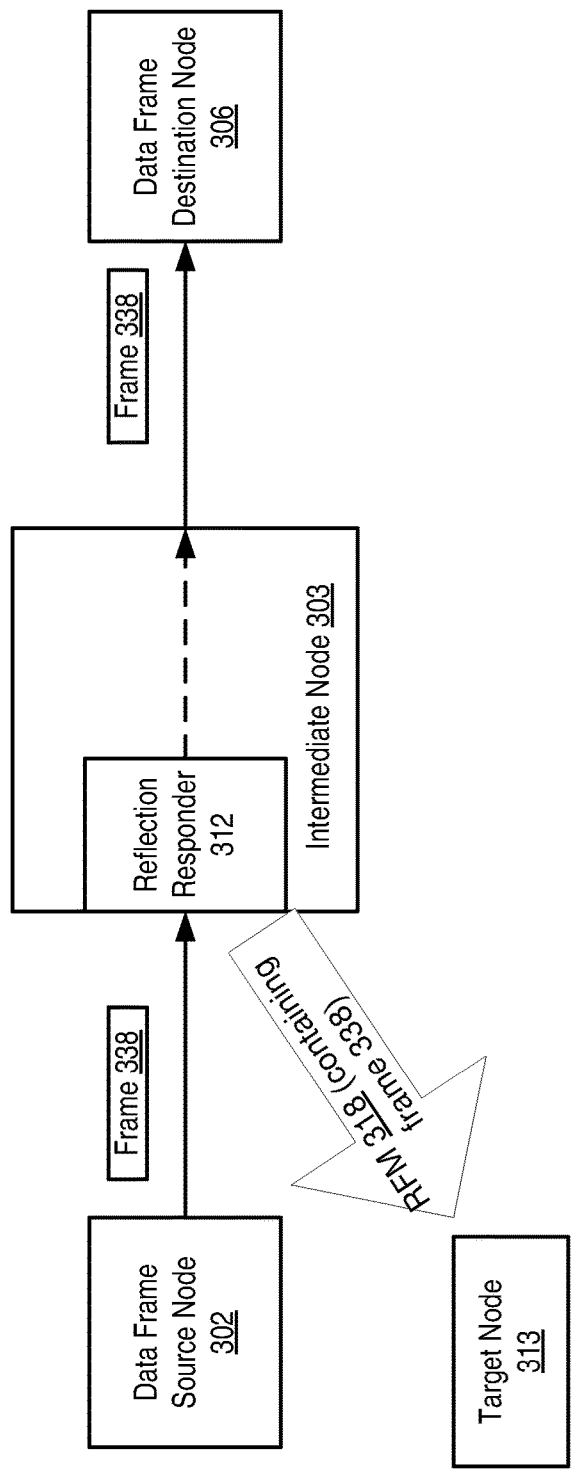
FIG. 3 is a block diagram illustrating the operations of DDCFM forward path test.

FIG. 3 is a block diagram illustrating the operations of DDCFM forward path test. Network 300 contains data frame source node 302, intermediate node 303, data frame destination node 306, and target node 313. The data frame source node 302 is where data frame 338 is sourced. The data frame goes through intermediate node 303 and reaches data frame destination node 306. FPT reflection responder 312 is implemented at intermediate node 303 to determine whether frame 338 can reach target node 313. The target node 313 and the intermediate node 303 are within a same maintenance domain (MD).

In order for the target node 313 to distinguish the reflected data frame 338 from other traffic, the reflected frame 338 is encapsulated with an RFM header. The RFM header added to the reflected frame carries the same maintenance domain level associated with reflection responder 312 thus the RFM 318 (encapsulating reflected data frame 338) is contained within the same MD too. At target node 313, RFM 318 is received and it may analyze the frame to determine if the encapsulated frame 338 is received without error. Through FPT, an operator of network 300 may determine whether data frames may reach target node 313 from intermediate node 303 without disrupting the data frames from their destinations.

In summary, FPT operations of DDCFM include reflection responder configuration, the action to reflect identified data frames, and the analysis of the reflected data frames. FPT is a part of OAM solutions that are known and implemented in some networks. Embodiments of the invention enhance FPT operations for supporting service chaining and they offer several benefits. Enhancing FPT for service chaining may not require modifications on the functionality of network devices. Current and emerging network devices such as bridges, switches, virtual switches, hypervisors, and entities within software defined networking (SDN) system and entities within cloud and data center systems can implement this functionality as a part of OAM process. In addition, enhancing FPT for supporting service chaining, instead of a new protocol suite, can re-use many or even all the OAM architecture elements, and enabling, for example, the domain level constructs and the service identification techniques (service multiplex functions etc.).

Enhanced FPT for Supporting Service Chaining

In a data network, a network device, containing virtual node, sends traffic through its ports (sometimes virtual/logical ports). Services offered in the network may be scattered on various physical and/or virtual devices within a network domain or potentially across network domains. A service is associated with a network device by physical, logical, or virtual interfaces, where an appliance providing the service is uniquely identified by an MAC address and potentially service identifiers carried by additional Tags supported by traffic forwarding function in the domain.

As discussed herein above, a network supports two main functions for service chaining, one is an analyzing function and the other is a sequencing function. The analyzing function may be provided by a DDCFM reflection responder (RR), which may be implemented on top of the MEP function. The MEP function is potentially already configured on the ports of network devices to monitor services in the maintenance domains. The RR uses its RR filter to analyze received frames (sometimes referred to as filtered frames as the received frames are filtered for service chaining) in order to identify those that are to be service chained and map them to a sequence of services applicable to identified flows. The DDCFM RR serving the analyzing function may be referred to as a traffic classifier.

The sequencing function may be provided by an RFM receiver (such as a service processing entity (e.g., a service processor) within the target node 313 illustrated in FIG. 3). Instead of merely receiving and terminating an RFM frame though, the service processing entity within the target node 313 providing sequencing function needs to decapsulate a received RFM frame and encapsulate an updated RFM frame again after the node processes the frame for a service. The RFM receiver serving the sequencing function may be referred to as a traffic sequencer.

Figure 2:
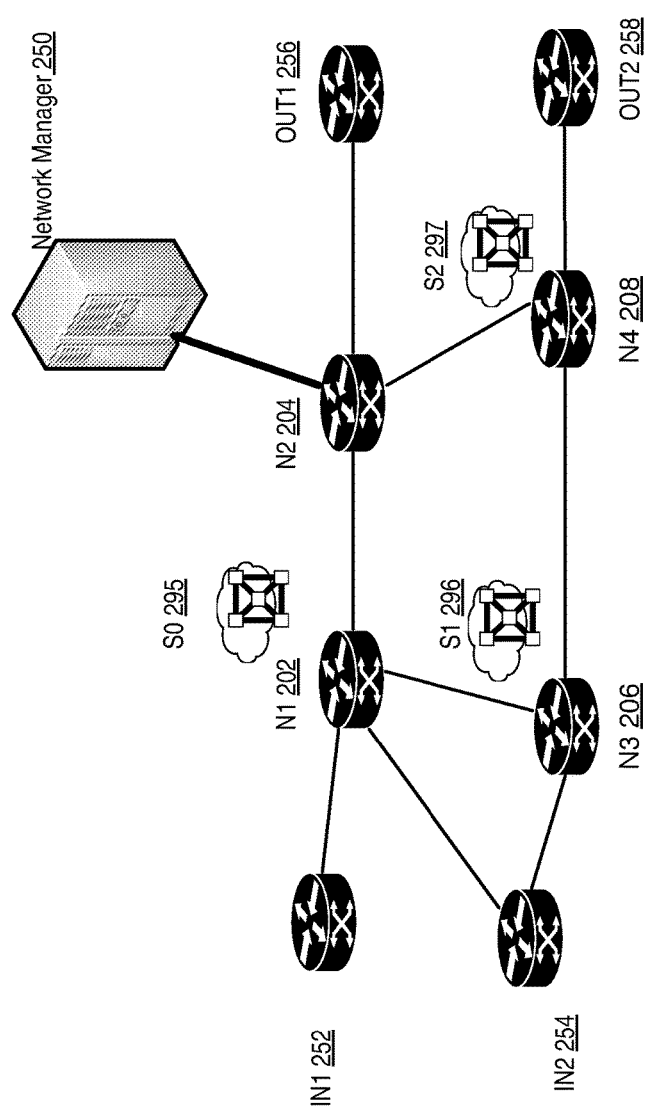
FIG. 2 illustrates another example of inline service chaining for a data network.
Figure 4:
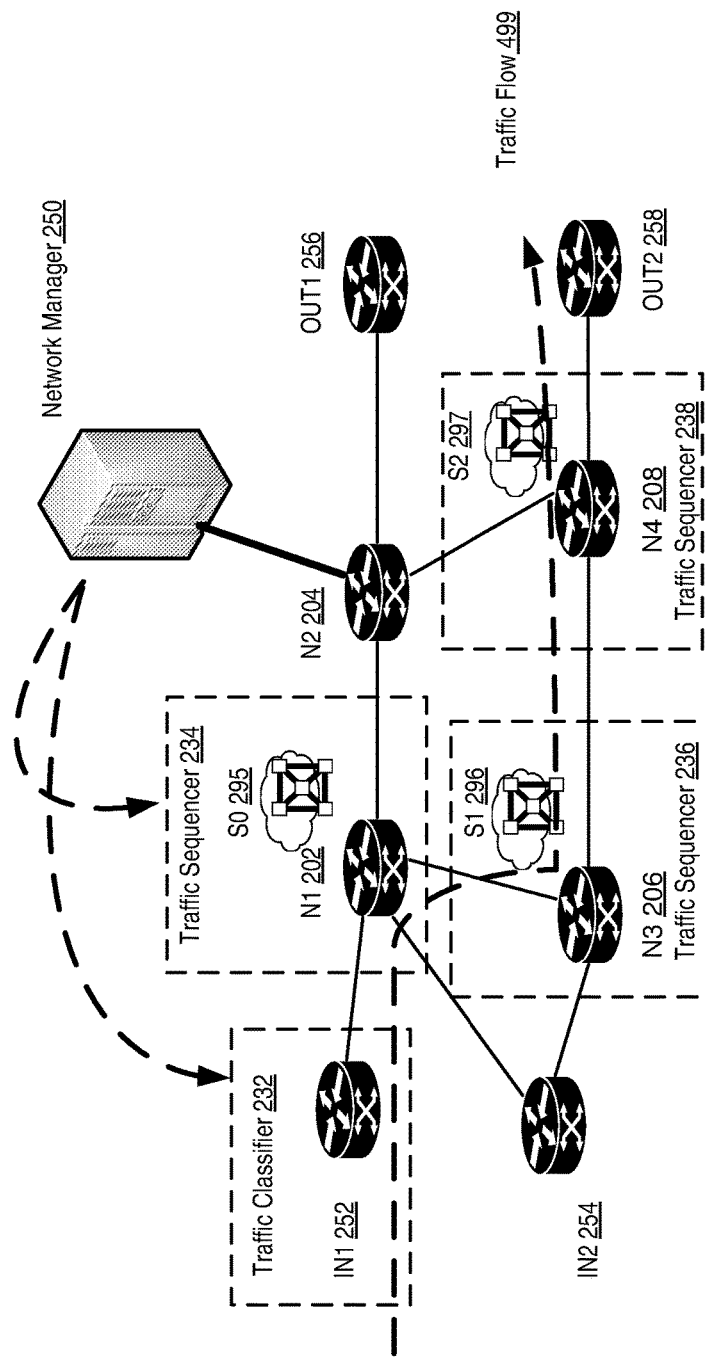
FIG. 4 illustrates network devices serving as traffic classifier and sequencers according to one embodiment of the invention.

FIG. 4 illustrates network devices serving as traffic classifier and sequencers according to one embodiment of the invention. FIG. 4 is similar to FIG. 2, and the same or similar references indicate elements or components having the same or similar functionalities. As illustrated in FIG. 4, traffic classifier 232 is associated with ingress node 252. Traffic classifier 232 selects a chain of services for a received frame. Generally traffic classifier 232 (or referred to as packet or frame classifier) determines which flow the received frame belongs to and selects the chain of services associated with the traffic flow. That is, traffic classifier 232 determines a sequence of services the receiving frame to be processed through.

After the sequence of services is determined by traffic classifier 232, the frame is forwarded to go through appliances associated with the sequence of services residing at various network devices. Thus, the frame goes through traffic sequencers 234, 236, and 238, along with other frames within the exemplary traffic flow 499.

Traffic classifier 232 encapsulates a received frame with an RFM header, superseding the original frame header information, and introduces a new header and potentially additional fields (e.g., TLVs) providing the proper information that would enable forwarding the frame to the location of the appliances providing the services to be visited. In principle, the forwarding field can contain any type of tags that are supported by the forwarding mechanisms applicable to the maintenance domain. The RFM header, for example, can contain VID (virtual local area network identifier), I-tag (backbone service instance tag), service identifier (SID) or any other types of tag identifier that has been specified or will be specified. Special new tags can be defined in order to facilitate forwarding of the frame in a sequence of services. Yet, no special tags or special forwarding rules are required in general.

The RFM header may identify each appliance providing the service of a chain of services by a <MAC, VID> pair in one embodiment. In other embodiment, a MAC, a VID, or other tag may be utilized to identify each appliance, where the identifier is associated with a port (physical or virtual) of a service. The various embodiments of identifiers are in general referred to as appliance identifiers.

The chain of services may then be identified as an ordered sequence list of appliance identifiers, where the appliance associated with the first service to be served is placed at the head of the ordered sequence list and the appliance associated with the last service is placed at the tail. Each traffic sequencer is associated with an appliance identifier, thus RFM header may identify each traffic sequencer the frame is processed through using an appliance identifier. Thus, a appliance identifier uniquely identifies a traffic sequencer and its associated service. Note while each traffic sequencer is illustrated to be associated with one network device in FIG. 4, multiple traffic sequencers may be associated with a same network device, similarly, a single traffic sequencer may be associated with multiple network devices (for a service requiring multiple network devices to process).

The ordered sequence list may be determined by the control planes of network devices or a management system (e.g., network manager 250 of FIG. 4). The determination of the order of appliance identifiers may be performed outside of operations of reflection responder operations. In addition, the head of the ordered sequence list identifies the very next service a frame to be served (as it identifies the corresponding appliance of the very next service), thus it is the service destination for the frame at the moment. Thus, the head of the ordered sequence list may be designated as the destination while the rest of the ordered sequence list of appliance identifiers is attached as a sequence TLV to an RFM frame.

Figure 5:
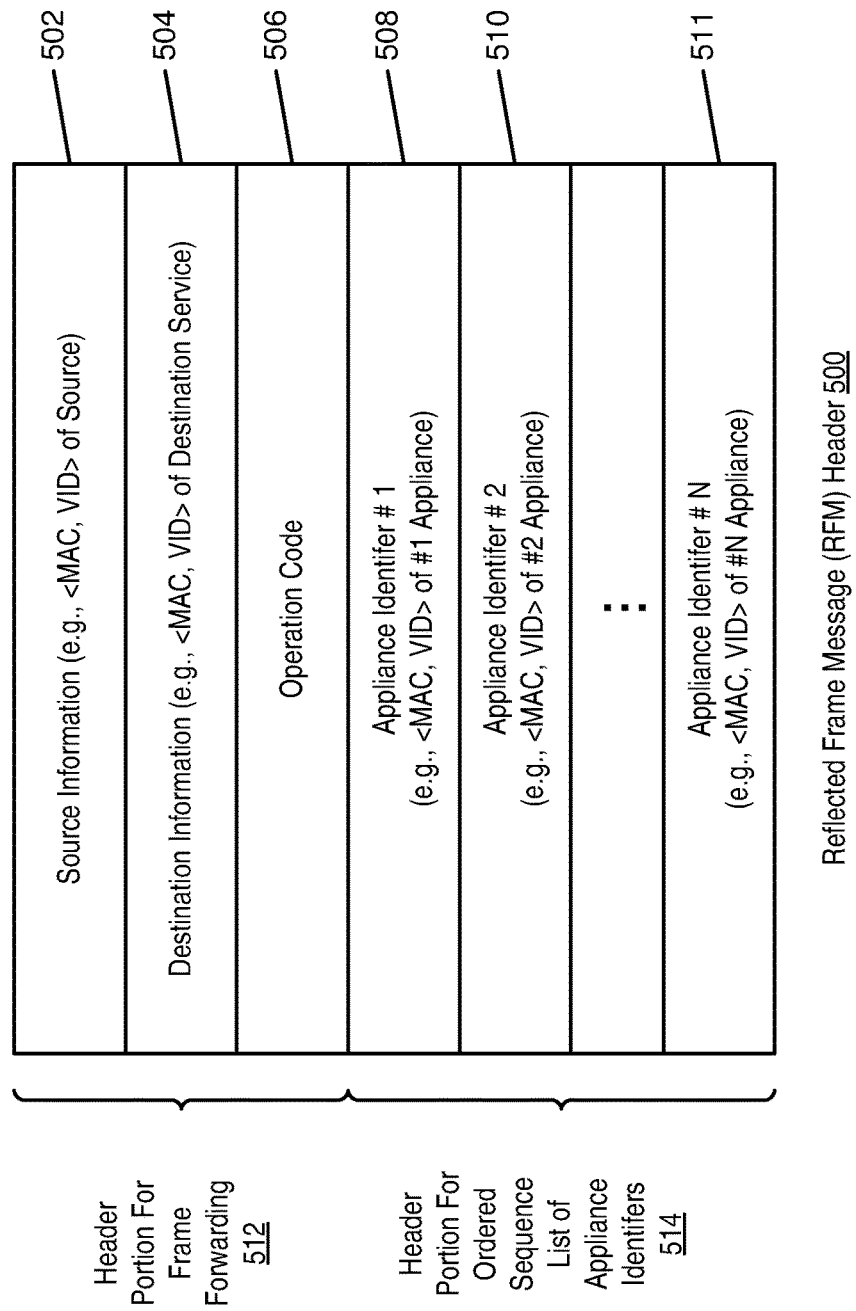
FIG. 5 illustrates an RFM header that encapsulates a frame according to one embodiment of the invention.

FIG. 5 illustrates an RFM header that encapsulates a frame according to one embodiment of the invention. The RFM header 500 contains a source information field 502, which contains the identification information of the source of the associated RFM frame. It can be the identification of a traffic classifier, or as discussed herein below, it can also the identification of traffic sequencers as the frame is transmitted through a network. The RFM header also contains a destination information field 504, which contains the identification information of the destination of the associated RFM frame. The destination is the very next hop the RFM frame is destined to, and it is an appliance identifier such as a <MAC, VID> pair.

The RFM header may also contain operation code (often referred to as op code or opcode) field 506. Operation code identifies the type of the frame. In one embodiment, hexadecimal value 0x6 indicates the frame is an RFM frame. The fields of source information, destination information, and operation code are contained in the portion of the RFM header (reference 512) that guides the frame forwarding of the RFM frame.

When the ordered sequence list of services to be served contains more than one service, an RFM frame contains additional TLVs at the RFM header to attach the rest of the ordered sequence list of appliance identifiers at reference 514. The additional TLVs are in the order of services to be served, i.e., appliance identifier #1 at 508 identifies a service to be served right after the service identified by destination information at 504, and appliance identifier #2 at 510 identifies a service to be served right after the service identified by appliance identifier #1, and so on ending at appliance identifier #N at reference 511 until the full ordered sequence list is included. Each appliance identifier can be one of the various embodiments of identifiers as discussed herein above.

Note while only the discussed fields are illustrated in the RFM header 500, the RFM header 500 may contain more fields to perform reflection responder operations. For example, it may contain maintenance domain level field, version field, flag field, and etc.

At a traffic sequencer (which is associated with a service processing entity such as a service processor within a network device), as an RFM receiver, it determines that whether a received RFM frame is destined to itself. If it is destined to itself, by checking the operation code, it determines that the frame is an RFM frame. It then removes the RFM header of the RFM frame and serves the frame with an associated service. The removed RFM header may also contain an ordered sequence list of appliance identifiers (as illustrated at reference 514 of FIG. 5), the ordered sequence list indicating that the frame needs to be served by additional services. In that case, the traffic sequencer encapsulates the processed frame being served again as an RFM frame, where the destination information is updated to be the appliance identifier at the head of the ordered sequence list for example, a <MAC, VID> pair representing the destination for the new RFM frame. The source information may also be updated to be the traffic sequencer's information. If there are one or more appliance identifiers remaining at the ordered sequence list, the remainder is attached as TLVs of the updated new RFM frame forwarding to its destination. The procedure continues until all the services associated with the ordered sequence list of appliance identifiers are served to the frame.

Figure 6:
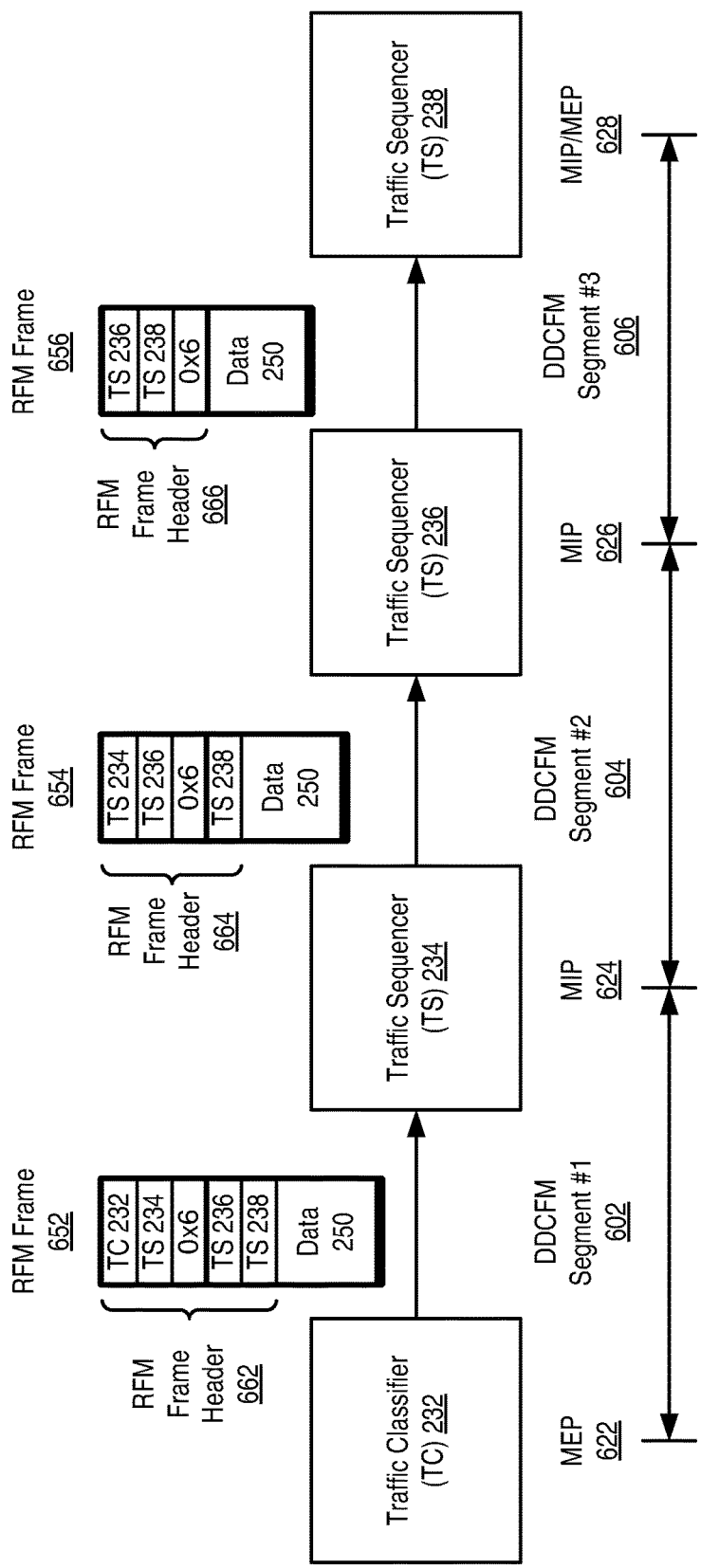
FIG. 6 illustrates RFM frame processes for supporting service chaining in a data network according to one embodiment of the invention.

FIG. 6 illustrates RFM frame processes for supporting service chaining in a data network according to one embodiment of the invention. FIG. 6 is a simplification version of FIG. 4, where network devices, services, and network managers are ignored for clarity of discussion, but the same or similar references indicate elements or components having the same or similar functionalities.

Referring to FIG. 6, at traffic classifier 232 (at ingress node 252 of FIG. 4), a frame is received, and the frame is determined to be served by a service chain. The service chain is an ordered service list of services S0, S1, and S2 (not shown in FIG. 6 but illustrated in FIG. 4) at traffic sequencers 234, 236, and 238 respectively. Thus traffic classifier 232 forms an RFM frame 652 as illustrated in FIG. 6. The traffic classifier 232 encapsulates the received frame as data 250, and adds an RFM frame header 662. The RFM frame header 662 contains a source information indicating that the source is traffic classifier 232 (illustrated as TC 232), and the destination is the very next traffic sequencer 234 (illustrated as TS 234). In addition, the RFM frame header 662 contains an opcode hexadecimal 0x6 indicating that the frame is an RFM frame. Furthermore, the RFM frame header 662 contains an ordered sequence list of traffic sequencer associated with services. As illustrated, the additional TLV field is ordered with traffic sequencer 236 first and traffic sequencer 238 second, which indicates that the data 250 will be served at traffic sequencer 236 first (for service S1) and traffic sequencer 238 second (for service S2) after the indicated destination traffic sequencer 234.

At traffic sequencer 234, it receives the RFM frame 652, and by checking the destination information (represented by a variety of possible appliance identifiers), it knows the RFM frame is destined to itself. By checking the opcode it knows that the frame is an RFM frame. It then processes the encapsulated data 250 for service (service S0 as illustrated in FIG. 4). After the encapsulated data is processed, traffic sequencer 234 encapsulates the processed data 250 again in RFM frame 654. RFM frame 654 is similar to RFM frame 652 with several fields updated. The source information now indicates that the source is traffic sequencer 234 (illustrated as TS 234), and the destination is the very next traffic sequencer 236 (illustrated as TS 236). In addition, the ordered sequence list of traffic sequencer associated with services is updated to include only appliance identifier associated with traffic sequencer 238 as the associated service, S2, needs to serve data 250 after the very next hop. RFM frame 654 is then sent toward its destination of traffic sequencer 236.

At traffic sequencer 236, it repeats the frame process similar to that of traffic sequencer 234 through identifying the frame, processing the encapsulated data 250 for service (service S1 as illustrated in FIG. 4), and encapsulating the processed data 250 again. The newly encapsulated frame is illustrated as RFM frame 656, where the source is now traffic sequencer 236, and the destination is the very next and only remaining traffic sequencer 238 for the service chain. The RFM frame 656 is then sent to traffic sequencer 238, which serves the encapsulated data 250 with service S2. After traffic sequencer 238, the received frame has been processed by the full service chain, and the traffic steering through the network now is complete.

Note that the received frame goes through several segments, and each is a DDCFM segment. The first segment 602 starts from a MEP, that is, a traffic classifier is most often associated with a MEP, while a traffic sequencer may be associated with a MIP or a MEP. MEP entity supports service chaining by having the capability to map an ordered service list of service chain to an ordered list of traffic sequencers and generate the initial RFM frames, thus the subsequent traffic sequencers may be implemented at a MIP or a MEP entity to de-encapsulate and re-encapsulate the RFM frames and process the frames. Thus, the analyzing function does not need to be performed at each hop a frame goes through (only at the traffic classifier), and the sequencing function is distributed across multiple traffic sequencers thus it is less computing intensive for a given traffic sequencer.

Embodiments of Processes at Traffic Classifier

Figure 7:
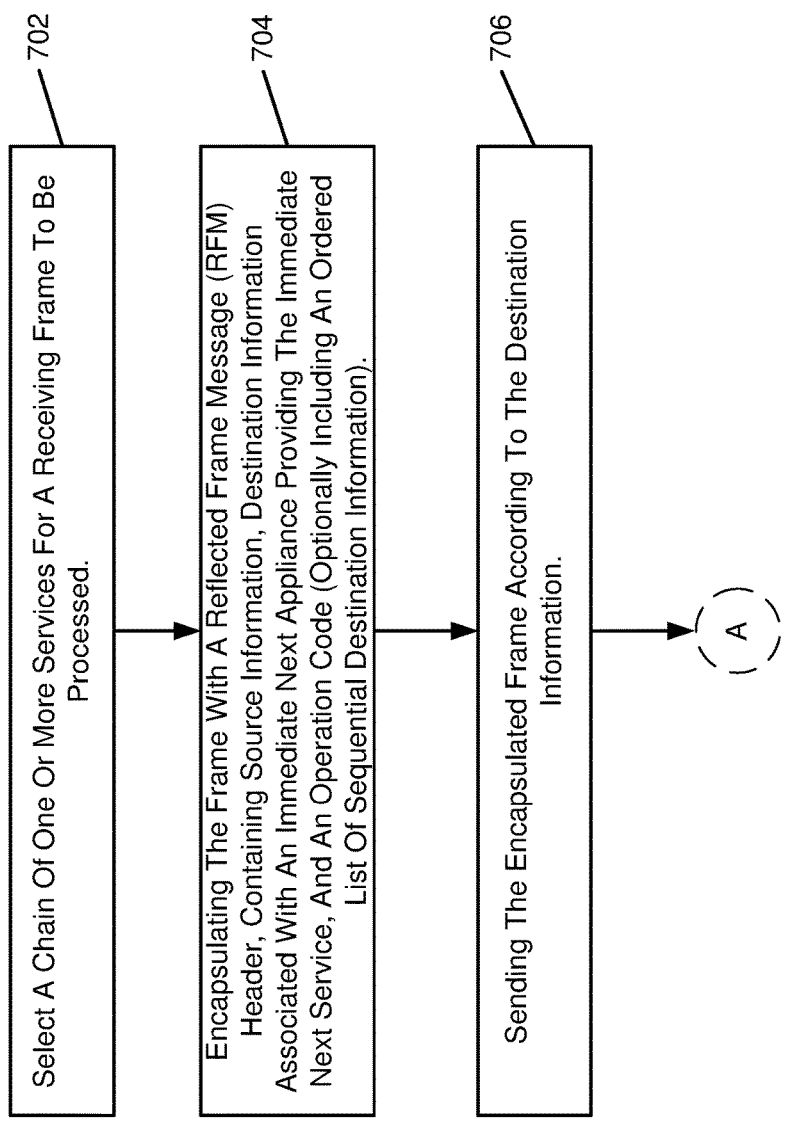
FIG. 7 is a block diagram illustrating processes transmitting RFM frames at a network device for supporting service chaining according to one embodiment of the invention.

FIG. 7 is a block diagram illustrating processes transmitting RFM frames at a network device for supporting service chaining according to one embodiment of the invention. The network device containing one or more service processing entities such as service processor 1000 illustrated in FIG. 10, and the data network offers a set of services. The set of services are associated with a number of network devices. A network device may be associated with a number of services as it may contain more than one service processing entities corresponding to appliances to provide services, and a service may be associated with a number of network devices. Note a service may reside at a network device, or only be virtually associated with one or more network devices. Subscribers of the data network are served by chains of one or more services.

At reference 702, upon receiving a frame from a subscriber at a service processing entity serving as a traffic classifier, the network device selects a chain of one or more service for the frame to be processed at the network device, i.e. served. The chain of one or more service may be an ordered list of services for the frame to be served. Note the selection of the chain may be determined locally by the network device or by a network manager remotely.

Then at reference 704, the network device encapsulates the frame with a reflected frame message (RFM) header to form an RFM frame. In one embodiment, the encapsulation is performed by the service processor within the network device as discussed herein. The RFM header contains source information associated with the service processing entity, indicating that the RFM frame is sourced from the service processing entity. The RFM header also contains destination information associated with an immediate next appliance providing an immediate next service for the frame. The RFM header further contains an operation code indicating the frame being an RFM frame. Note if there is more than one service for the frame to be served, an ordered list of sequential destination information associated with the service(s) other than the immediate next service is also attached at the RFM header.

In one embodiment, the destination information includes a MAC address associated with appliances providing services, being the immediate next appliance or appliances within the attached ordered list. In another embodiment, the destination information includes a tag, and the tag can be one of a VID, a SID, an I-tag, or other tag that independently or in combination with MAC address that uniquely identifies services.

At reference 706, the network device sends the encapsulated frame according to the destination information. That is, the encapsulated frame is to be served with the immediate next service, which is identified by the destination information.

Note the data network may have implemented data-driven and data-dependent connectivity fault management (DD-CFM) for fault management already, and the network device is a MEP entity of the data network.

Embodiments of Processes at Traffic Sequencer

Figure 8:
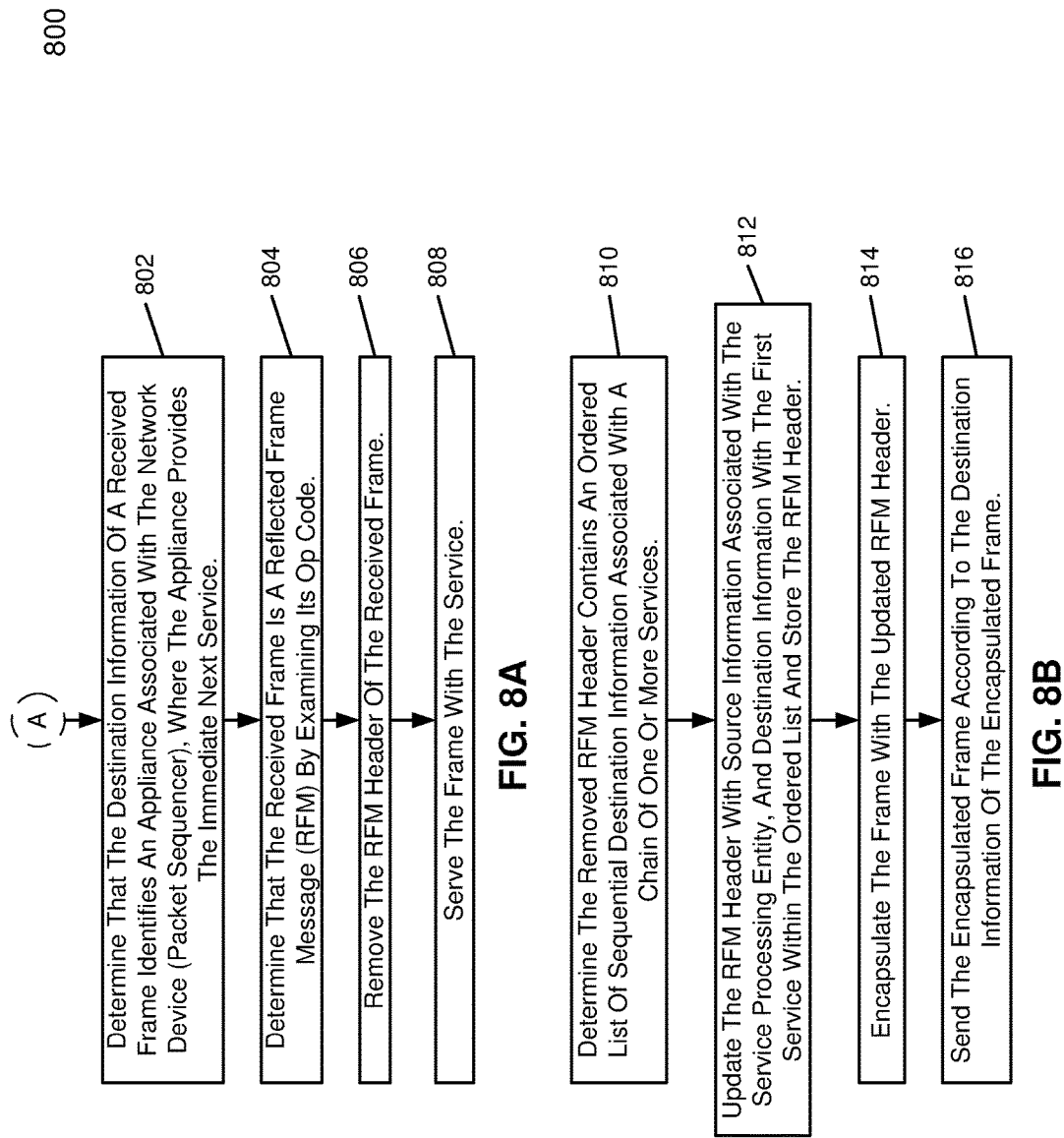
FIGS. 8A-B are block diagrams illustrating processes at a network device receiving RFM frames for supporting service chaining according to one embodiment of the invention.

The encapsulated frame in an RFM frame is sent to be served with the immediate next service associated with a traffic sequencer. A network device serving as a traffic sequencer performs operations for supporting service chaining. Specifically, in one embodiment, a service processor within the network device serving as the traffic sequencer. FIGS. 8A-B are block diagrams illustrating processes at a network device receiving RFM frames for supporting service chaining according to one embodiment of the invention. The network device may be a MIP or a MEP entity of the data network. While the processes illustrated in FIGS. 8A-B may be a continuation of FIG. 7, that is, they receive frames encapsulated by a process illustrated in FIG. 7, FIGS. 8A-B may support service chaining where the RFM frame is encapsulated in a process different from the one illustrated in FIG. 7.

Referring to FIG. 8A, at reference 802, the network device determines that the destination information of the received frame identifies the appliance, which is associated with a service of a set of services. The appliance provides the service. In one embodiment, the determination is made by a service processor with the network device. By examining the operation node embedded in the frame header, the network device determines that the received frame is an RFM frame at reference 804. At reference 806, the network device removes the RFM header of the frame and it serves the frame with the associated service at reference 808. If the RFM frame header does not contain optional TLV fields pointing to additional one or more appliances providing services the frame needs to be served, the process ends, and the frame has been served by a selected chain of service.

If the RFM frame header contains optional TLV fields pointing to additional one or more services the frame needs to be served, the process continues at FIG. 8B. Referring to FIG. 8B, the network device determines that the removed RFM header contains an ordered list of sequential destination information associated with a chain of one or more services at reference 810. At reference 812, the network device then updates the RFM header with source information associated with the serving processing entity (e.g., service processor 1000 of FIG. 10), destination information associated with the very first service of the ordered list of sequential destination information (represented by appliance identifiers). That is, the destination information of the updated RFM header points to the very next service the frame is supposed to be served. The updated RFM header is then saved/stored. The very first appliance associated with the very first service is then removed from the ordered list of sequential destination information. If the remaining ordered list of sequential destination information still contains destination information, the remaining ordered list is attached to the updated RFM header, such as illustrated at reference 514 of FIG. 5.

Referring back to FIG. 8B, after the frame is served at the network device, the network device encapsulates the frame with the updated RFM header at reference 814. Then at reference 816, the network device sends the encapsulated frame out toward the next service at reference 816.

The processes illustrated in FIGS. 8A-B may repeat multiple times until all the services in a service chain (stored in the destination information and the ordered list of sequential destination information) are served.

Embodiments in SDN or NFV

While the discussion on utilizing RFM frame to support service chaining has been on generic data networks, such as traditional networks where network devices contains an integrated control plane and data plane, embodiments of the invention are not so limited. It can be integrated well with emerging networking technologies such as software defined networking (SDN) system and network function virtualization (NFV), where control function and data forwarding function may be separated.

Figure 9:
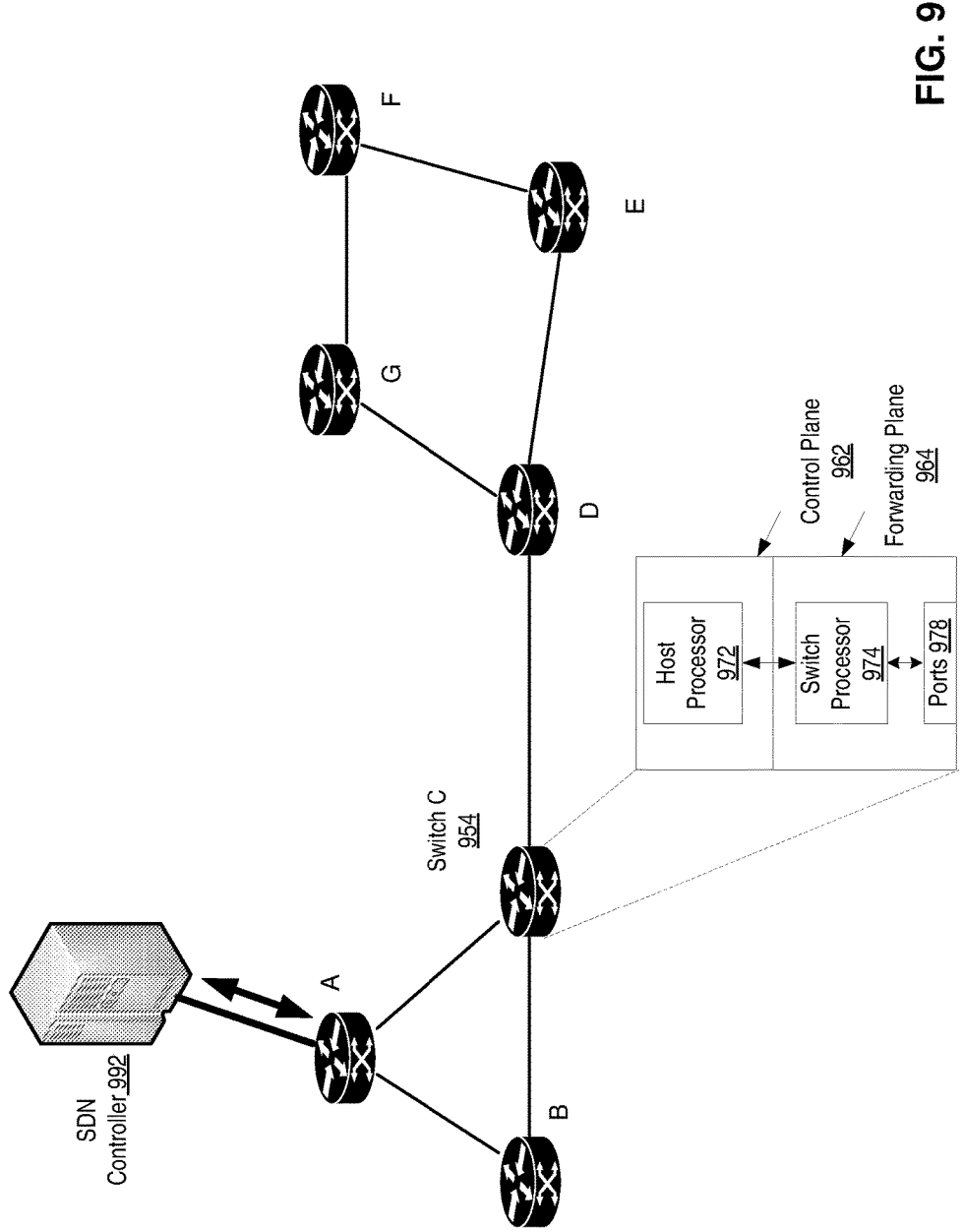
FIG. 9 is a block diagram illustrating a SDN network.

FIG. 9 is a block diagram illustrating a SDN network. SDN network 900 comprises a number of forwarding elements and a number of controllers that instruct the forwarding elements' forwarding behavior. Note a SDN network may contain a much larger number of network devices and existing network devices may be implemented with SDN compatible protocols thus become a part of a SDN network (e.g., an existing IP router may support OpenFlow protocol and thus become a SDN forwarding element or a SDN controller). Thus SDN network 900 is for illustrating logical SDN network configuration only.

Forwarding Elements

The main task of a SDN forwarding element (referred to as an OpenFlow switch or simply switch in OpenFlow parlance when the SDN complies with OpenFlow standards), is to forward packets within the SDN forwarding element from an ingress port to an egress port, according to the rules in flow tables programmed by one or more SDN controllers. Each flow entry contains a set of actions such as forwarding packets to a given port, modifying certain bits in a packet header, encapsulating packets to the SDN controller, or dropping the packets. For the first packet in a new flow, the forwarding element often forwards the packet to the SDN controller to trigger the new flow being programmed. It can also be used to forward slow-path packets such as Internet Control Message Protocol (ICMP) packets to the SDN controller for processing. Note that the concept of a flow can be defined broadly, e.g., a TCP connection, or all traffic from a particular MAC address or IP address. Also note that a packet within a SDN network is defined broadly and it may be an Ethernet frame, an IP network packet, or a message in a proprietary format.

SDN Controllers

A SDN controller (often referred to as a remote controller or controller) adds and removes flow-entries from a flow table. It defines the interconnection and routing among a set of SDN forward elements and other network devices. It also handles network state distribution, such as collecting information from the set of SDN forward elements and distributing forwarding/routing instructions to them. The SDN controller can also be programmed to support new addressing, routing, and complex packet processing applications. The SDN controllers are the "brains" of a SDN network. A forwarding element needs to connect to at least one SDN controller to function correctly.

Referring to FIG. 9, SDN network 900 contains SDN controller 992 and a set of forwarding elements (or SDN switches, the terms "forwarding element" and "SDN switch" are used interchangeably herein below) A-G. Controller 992 (the terms "controller" and "SDN controller" are used interchangeably herein below) manages SDN switches A-G, and an SDN switch connects to its managing controller through a communication channel and the SDN switch not necessarily has a direct connectivity to a controller (thus the term "remote" controller).

An SDN switch can be viewed logically as containing two main components. One is a control plane and the other is a forwarding plane. A zoom-in view of SDN switch C at reference 954 illustrates the two planes. SDN switch C contains control plane 962 and forwarding plane 964. Control plane 962 coordinates management and configuration of SDN switch C. Configuration of forwarding plane 964 is achieved by running applications on host processor 972. Host processor 972 usually runs an operating system in order to provide a well-known development environment. Commands from host processor 972 are sent to the switch processor 974 using an interconnect (e.g., a peripheral component interconnect (PCI) bus). Exception packets (e.g., packet for routing and management) are often processed on host processor 972. Switch processor 974 interacts with various forwarding ports 978 of SDN switch C to forward and otherwise process incoming and outgoing packets.

Forwarding plane 964 is responsible for forwarding traffic (forwarding operations includes switching, routing, learning, etc.). It contains switch processor 974 that is designed to provide high throughput at the detriment of a more complex and flexible development environment. Different types high performance memory and hardware accelerator are often found on board of switch processor 974 for achieving the high throughput. In contrast, host processor 972 can be more complex and flexible at the detriment of providing high throughput as it processes more control packets (often referred to as slow path packets) than data packet thus throughput is less mission critical. When a SDN switch (e.g., SDN switch C) receives a packet associated with a new flow, it does not know where to forward the packet. Thus it sends the packet to its managing SDN controller, controller 992 in this example. Controller 992 receives the packet, and it programs a new flow entry and sends to SDN switch C. SDN switch C then forwards the packet according to the new flow entry.

An SDN network provides an opportunity to design dynamic anomaly detection and fault management methods in a network that makes use of the centralized control plan and the network-wide knowledge. Fault management protocol such as DDCFM can be conveniently implemented in a SDN network. With DDCFM being implemented in a SDN network, adding service chaining support only add incremental cost to the SDN network. Switches may act as traffic classifiers and traffic sequencers to guide frame forwarding through the SDN network, while SDN controller coordinates the frame forwarding with switches.

Network Devices Supporting Service Chaining

Figure 10:
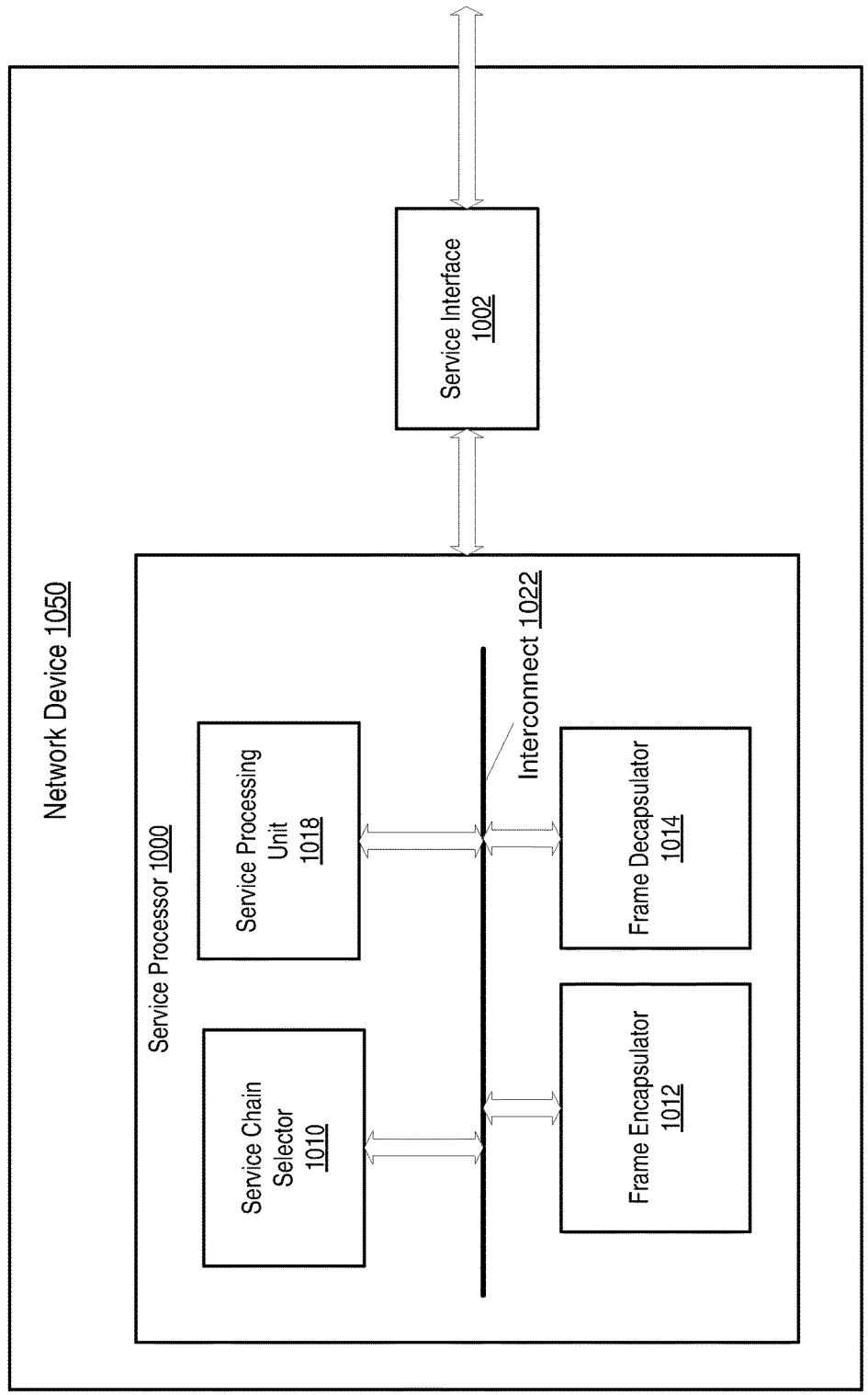
FIG. 10 is a block diagram illustrating a network device containing a processor implementing methods supporting service chaining according to one embodiment of the invention.

FIG. 10 is a block diagram illustrating a network device containing a processor implementing methods supporting service chaining according to one embodiment of the invention. The network device may be coupled to a data network, where the data network offers a set of services associated with a set of network devices. Subscribers of the data network are served by chains of one or more services.

Network device 1050 contains service processor 1000 and service interface 1002. Network device 100 may be a forwarding element of a SDN network, or a network device of a traditional network. Service processor 1000 may be a standalone processor or a part of a processor within a forwarding element of a SDN network or a network device of a traditional network. When frame service processor 1000 is a part of a larger processor, it may have dedicated network processing unit (NPU) or share processing unit with other applications.

Network device 1050 contains a service interface 1002 configured to transmit and receive frames. The received frames are processed at service processor 1000, and the frames finishing being processed are transmitted out of network device 1050 through service interface 1002.

Service processor 1000 may contain service chain selector 1010, frame encapsulator 1012, frame decapsulator 1014, and service processing unit 1018. These various modules are interconnected through interconnect 1022. Note that various modules can be implemented as a single unit or multiple units, the unit or units integrate various modules and perform similar function as the modules of service processor 1000, and these modules can be implemented in software, hardware or a combination thereof. Some modules illustrated in FIG. 10 may be implemented outside of service processor 1000 but communicatively coupled with service allocation processor 1000. In addition, other modules not illustrated or module outside of service processor 1000 (such as service interface 1002) may be implemented within service allocation processor 1000.

Note network devices implementing the embodiments of the invention may not have all the modules illustrated. For example, a network device serving as a traffic classifier may not have frame decapsulator 1014 in its service processor 1000. A network device serving as a traffic sequencer may not have service chain selector in its service processor 1000. However, a network device may serve as a traffic classifier for one traffic flow and a traffic sequencer for another traffic flow thus it contains all the modules illustrated in FIG. 10. Also note that a network device may contain multiple service processors and their corresponding service interfaces for various appliances/services. Thus, in one embodiment, the network device may be routed from a traffic classifier (implemented as a pair of service processor and its corresponding service interface) within the network device to a traffic sequencer (implemented as another pair of service process and its corresponding service interface) within the same network device.

In one embodiment, network device 1050 serves as traffic classifier of a data network. Service interface 1002 receives a frame and it forwards to service processor 1000. Service chain selector 1010 of service processor 1000 is then configured to select a chain of one or more services for the frame to be processed. The selection of the chain of one or more services may be determined locally by network device 1050, or it may be determined remotely from a network manager of the data network (e.g., SDN controller when the network is a SDN network). Then frame encapsulator 1012 is configured to encapsulate the frame with an RFM header. The RFM header contains source information associated with service processor 1000, destination information associated with an immediate next appliance providing an immediate next service for the frame within the selected chain of one or more services, and an operation code indicating the frame being an RFM frame. The encapsulated frame is then sent out of network device 1050 through service interface 1002.

Note the RFM header may further contain an ordered list of sequential destination information associated with the chain of one or more services, where the ordered list of sequential destination information is ordered based on an order of services of the chain after the immediate next service. Also note that the destination information may include a MAC address associated with the immediate next appliance providing the immediate next service. The destination information may also include a tag associated with the immediate next appliance, where the tag is one of a VID, I-tag, and SID. Also, network device 1050 may be a MEP entity of the data network. The data network may implement data-driven and data-dependent connectivity fault management (DDCFM).

In another embodiment, network device 1050 serves as a traffic sequencer of a data network, specifically, service processor 1000 serving as the traffic sequencer. Service interface 1002 receives a frame and it forwards to service processor 1000. Frame decapsulator 1014 is configured to determine that destination information of the frame identifies service processor 1000, and service processor 1000 is associated with a service of the set of services the frame is to be served. Frame decapsulator 1014 is further configured to determine that the frame is an RFM frame and removes an RFM header of the frame and sends the frame to service processing unit 1018, which serve the frame with the service.

Frame decapsulator 1014 may be further configured to determine that the removed RFM header contains an ordered list of sequential destination information associated with a chain of one or more services. Frame decapsulator 1014 then may update and store the removed RFM header, where the updated RFM header contains source information associated with service processor 1000, and destination information associated with first service within the ordered list of sequential destination information. After the frame is served by service processing unit 1018, frame encapsulator 1012 is configured to encapsulate the frame with the updated RFM header, and the encapsulated frame is sent out of network device 1050 through service interface 1002 according to destination information of the encapsulated frame.

Note when the network device serves as a traffic sequencer, network device may be a MIP entity of the network.

The operations of the flow diagrams in FIGS. 7 and 8A-B are described with reference to the exemplary embodiment of FIG. 10. However, it should be understood that the operations of flow diagrams can be performed by embodiments of the invention other than those discussed with reference to FIGS. 7 and 8A-B, and the embodiments discussed with reference to FIG. 10 can perform operations different than those discussed with reference to the flow diagrams of FIGS. 7 and 8A-B.

While the flow diagrams in the figures herein above show a particular order of operations performed by certain embodiments of the invention, it should be understood that such order is exemplary (e.g., alternative embodiments may perform the operations in a different order, combine certain operations, overlap certain operations, etc.).

A non-transitory machine-readable storage medium has instructions stored therein which when executed by a processor, causes the processor to perform operations for supporting service chaining at a network device of a data network. The data network offers a set of services associated with a set of appliances, where subscribers of the data network are served by chains of one or more services. The operations start upon receiving a frame, the network device selects a chain of one or more services for the frame to be processed by the data network. The originating service processor encapsulates the frame with a reflected frame message (RFM) header, the RFM header containing source information associated with the service processor, destination information associated with an immediate next service for the frame to be processed, and an operation code indicating the frame being an RFM frame. Then the network device sends the encapsulated frame according to the destination information of the encapsulated frame.

Another non-transitory machine-readable storage medium has instructions stored therein which when executed by a processor, causes the processor to perform operations for supporting service chaining at a network device of a data network. The data network offers a set of services associated with a set of appliances, where subscribers of the data network are served by chains of one or more services. The operations start upon receiving a frame, a service processor within a network device determines that destination information of the frame identifies the appliance, where the appliances associated with a service of the set of services. The service processor determines that the frame is a reflected frame message (RFM) frame by examining an operation code of the frame, and it then removes an RFM header of the frame and serves the frame with the service.

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

The invention claimed is:

1. A method of supporting service chaining at a first network device containing one or more service processing entities of a data network, wherein the data network offers a set of services associated with a set of network devices, wherein subscribers of the data network are served by chains of one or more services, the method comprising:
   upon receiving a frame sourced from a subscriber at a first service processing entity serving as a traffic classifier, selecting chain of one or more services for the frame to be processed by the data network;
   encapsulating the frame with a reflected frame message (RFM) header, the RFM header containing source information associated with the first service processing entity, destination information associated with an immediate next appliance providing an immediate next service within the selected chain of one or more services for the frame to be processed, and an operation code indicating the frame being an RFM frame; and
   sending the encapsulated frame according to the destination information of the encapsulated frame.

2. The method of claim 1, wherein the RFM header further contains an ordered list of sequential destination information associated with the chain of one or more services, and wherein the ordered list of sequential destination information is ordered based on an order of services of the chain after the immediate next service.

3. The method of claim 1, wherein the destination information includes a media access control (MAC) address associated with the immediate next appliance.

4. The method of claim 1, wherein the destination information includes a tag associated with the immediate next appliance, and wherein the tag is one of a virtual local area network identifier (VID), I-tag (backbone service instance tag), and service identifier (SID).

5. The method of claim 1, wherein the data network implements data-driven and data-dependent connectivity fault management (DDCFM), and wherein the first network device is a maintenance association end point (MEP) of the data network.

6. The method of claim 1, wherein the encapsulated frame is received at a second service processing entity serving as a traffic sequencer at the network device or a different network device, the second service processing entity
   determining that the destination information identifies an appliance associated with the second network device, wherein the appliance provides the immediate next service for the encapsulated frame;
   determining that the encapsulated frame is an RFM frame by examining the operation code of the frame;
   removing the RFM header of the encapsulated frame; and
   serving the frame the immediate next service.

7. The method of claim 6, wherein the second service processing entity further performs:
   determining that the removed RFM header contains an ordered list of sequential destination information associated with the chain of one or more services;
   updating and storing the removed RFM header, wherein the updated RFM header contains source information associated with the second network device, destination information associated with first service within the ordered list of sequential destination information;
   after the frame is served by the immediate next service, encapsulating the frame with the updated RFM header; and
   sending the encapsulated frame according to the destination information of the encapsulated frame.

8. The method of claim 6, wherein the second service processing entity is a maintenance domain intermediate point (MIP) of the data network.

9. The method of claim 1, wherein the data network is a software-defined networking (SDN) system.

10. A method of supporting service chaining at a first network device containing one or more service processing entities of a data network, wherein the data network offers a set of services associated with a set of network devices, wherein subscribers of the data network are served by chains of one or more services, the method comprising:
    upon receiving a frame at a first service processing entity serving as a traffic sequencer,
    determining that destination information of the frame identifies an appliance associated with the first service processing entity, wherein the appliance provides a service of the set of services;
    determining that the frame is a reflected frame message (RFM) frame by examining an operation code of the frame;
    removing an RFM header of the frame;
    determining that the removed RFM header contains an ordered list of sequential destination information associated with a chain of one or more services;
    updating and storing the removed RFM header, wherein the updated RFM header contains source information associated with the first service processing entity, destination information associated with first service within the ordered list of sequential destination information;
    serving the frame with the service;
    encapsulating the frame with the updated RFM header, after the frame is served by the service; and
    sending the encapsulated frame according to the destination information of the encapsulated frame.

11. The method of claim 10, wherein the first service processing entity is a maintenance domain intermediate point (MIP) of the data network.

12. The method of claim 10, wherein the data network is a software-defined networking (SDN) system.

13. The method of claim 10, wherein the frame was encapsulated by a second service processing entity serving as a traffic sequencer at the network device or a different network device before the first service processing entity receiving the frame, wherein the second service processing entity performs:
    upon receiving a subscriber frame from a subscriber, selecting the chain of one or more services for the subscriber frame to be served in the data network;
    encapsulating the subscriber frame with the RFM header, the RFM header containing source information associated with the second service processing entity, destination information associated with an appliance providing the service for the subscriber frame within the selected chain of one or more services, and the operation code indicating the subscriber frame being an RFM frame; and sending the encapsulated subscriber frame toward the first service processing entity.

14. The method of claim 13, wherein the RFM header further contains an ordered list of sequential destination information associated with the chain of one or more services, and wherein the ordered list of sequential destination information is ordered based on an order of services of the chain after the service.

15. A method of supporting service chaining in a data network, wherein the data network includes one or more network devices containing one or more service processing entities serving as a traffic classifier and one or more service processing entities serving as a traffic sequencer, wherein the data network offers a set of services associated with a set of network devices, wherein subscribers of the data network are served by chains of one or more services, the method comprising:

at a first service processing entity serving as a traffic classifier, upon receiving a frame from a subscriber, the first service processing entity:

selecting a chain of one or more services for the frame to be processed by the data network;

encapsulating the frame with a reflected frame message (RFM) header, the RFM header containing source information associated with the first service processing entity, destination information associated with an immediate next appliance providing an immediate next service within the selected chain of one or more services for the frame to be served, and an operation code indicating the frame being an RFM frame; and sending the encapsulated frame according to the destination information of the encapsulated frame, at a second service processing entity serving as a traffic sequencer, upon receiving the encapsulated frame, the second service processing entity:

determining that the destination information identifies an appliance associated with the second service processing entity, wherein the appliance provides the immediate next service for the encapsulated frame;

determining that the encapsulated frame is an RFM frame by examining the operation code of the frame;

removing the RFM header of the encapsulated frame; and serving the frame the immediate next service.

16. The method of claim 15, wherein the RFM header further contains an ordered list of sequential destination information associated with the chain of one or more services, and wherein the ordered list of sequential destination information is ordered based on an order of services of the chain after the immediate next service.

17. The method of claim 15, wherein the destination information includes a media access control (MAC) address associated with the immediate next appliance.

18. The method of claim 15, wherein the destination information includes a tag associated with the immediate next appliance, and wherein the tag is one of a virtual local area network identifier (VID), I-tag (backbone service instance tag), and service identifier (SID).

19. The method of claim 15, wherein the data network implements data-driven and data-dependent connectivity fault management (DDCFM), and wherein the first service processing entity is a maintenance association end point (MEP) of the data network.

20. The method of claim 15, wherein the second service processing entity is a maintenance domain intermediate point (MIP) of the data network.

21. The method of claim 15, wherein the data network is a software-defined networking (SDN) system.

22. A network device of a data network for supporting service chaining, wherein the data network offers a set of services associated with a set of network devices, wherein subscribers of the data network are served by chains of one or more services, the network device comprising:

a service interface configured to receive frames sourced from subscribers; and a service processor; supporting service chaining, wherein the service processor comprises:

a service chain selector configured to select a chain of one or more services for a received frame to be processed by the data network, wherein the frames are sourced from subscribers;

a frame encapsulator configured to encapsulate the frame with a reflected frame message (RFM) header, the RFM header containing source information associated with the service processor, destination information associated with an immediate next appliance providing an immediate next service within the selected chain of one or more services for the frame to be served, and an operation code indicating the frame being an RFM frame, wherein the service interface further being configured to send the encapsulated frame according to the destination information of the encapsulated frame.

23. The network device of claim 22, wherein the RFM header further contains an ordered list of sequential destination information associated with the chain of one or more services, and wherein the ordered list of sequential destination information is ordered based on an order of services of the chain after the immediate next service.

24. The network device of claim 22, wherein the destination information includes a media access control (MAC) address associated with the immediate next appliance.

25. The network device of claim 22, wherein the destination information includes a tag associated with the immediate next appliance, and wherein the tag is one of a virtual local area network identifier (VID), I-tag (backbone service instance tag), and service identifier (SID).

26. The network device of claim 22, wherein the data network implements data-driven and data-dependent connectivity fault management (DDCFM), and wherein the service processor is a maintenance association end point (MEP) of the data network.

27. The network device of claim 22, wherein the data network is a software-defined networking (SDN) system.

28. A network device of a data network for supporting service chaining, wherein the data network offers a set of services associated with a set of network devices, wherein subscribers of the data network are served by chains of one or more services, the network device comprising:

a service interface configured to receive frames sourced from subscribers; and a service processor supporting service chaining, including comprises:

a frame decapsulator configured to determine that destination information of a received frame identifies an appliance associated with the service processor, wherein the appliance provides a service of the set of services, wherein the frames received are sourced from subscribers;

the frame decapsulator further configured to determine that the frame is a reflected frame message (RFM) frame by examining an operation code of the frame, and the frame decapsulator further configured to remove an RFM header of the frame;

the frame decapsulator further configured to determine that the removed RFM header contains an ordered list of sequential destination information associated with a chain of one or more services;

the frame decapsulator for updating and storing the removed RFM header, wherein the updated RFM header contains source information associated with the service processor and destination information associated with an appliance providing first service within the ordered list of sequential destination information;

a service processing unit configured to serve the frame wherein the frame encapsulator encapsulates the frame with the updated RFM header, after the frame is served by the service processing unit, and wherein the encapsulated frame is sent through the service interface according to the destination information of the encapsulated frame.

29. The network device of claim 28, wherein the service processor is a maintenance domain intermediate point (MIP) of the data network.

30. A non-transitory machine-readable storage medium having instructions stored therein, which when executed by a processor, causes the processor to perform operations implemented by a network device containing one or more service processing entities of a data network for support service chaining, wherein the data network offers a set of services associated with a set of network devices, wherein subscribers of the data network are served by chains of one or more services, the operations comprising:

upon receiving a frame sourced from a subscriber at a first service processing entity serving as a traffic classifier, selecting a chain of one or more services for the frame to be processed by the data network;

encapsulating the frame with a reflected frame message (RFM) header, the RFM header containing source information associated with the first service processing entity, destination information associated with an immediate next appliance providing an immediate next service within the selected chain of one or more services for the frame to be served, and an operation code indicating the frame being an RFM frame; and sending the encapsulated frame according to the destination information of the encapsulated frame.

31. The non-transitory machine-readable storage medium of claim 30, wherein the RFM header further contains an ordered list of sequential destination information associated with the chain of one or more services, and wherein the ordered list of sequential destination information is ordered based on an order of services of the chain after the immediate next service.

32. The non-transitory machine-readable storage medium of claim 30, wherein the destination information includes a media access control (MAC) address associated with the immediate next appliance.

33. The non-transitory machine-readable storage medium of claim 30, wherein the destination information includes a tag associated with the immediate next appliance, and wherein the tag is one of a virtual local area network identifier (VID), I-tag (backbone service instance tag), and service identifier (SID).

34. The non-transitory machine-readable storage medium of claim 30, wherein the data network implements data-driven and data-dependent connectivity fault management (DDCFM), and wherein the first processing entity is a maintenance association end point (MEP) of the data network.

35. A non-transitory machine-readable storage medium having instructions stored therein, which when executed by a processor, causes the processor to perform operations implemented by a network device containing one or more service processing entities of a data network for support service chaining, wherein the data network offers a set of services associated with a set of network devices, wherein subscribers of the data network are served by chains of one or more services, the operations comprising:

upon receiving a frame at a service processing entity serving as a traffic sequencer, determining that destination information of the frame identifies an appliance associated with the service processing entity, wherein the appliance provides a service of the set of services;

determining that the frame is a reflected frame message (RFM) by examining an operation code of the frame;

removing an RFM header of the frame;

determining that the removed RFM header contains an ordered list of sequential destination information associated with a chain of one or more services;

updating and storing the removed RFM header, wherein the updated RFM header contains source information associated with the service processing entity, destination information associated with first service within the ordered list of sequential destination information;

serving the frame with the service;

encapsulating the frame with the updated RFM header, after the frame is served by the service; and sending the encapsulated frame according to the destination information of the encapsulated frame.

36. The non-transitory machine-readable storage medium of claim 35, wherein the service processing entity is a maintenance domain intermediate point (MIP) of the data network.

37. The non-transitory machine-readable storage medium of claim 35, wherein the data network is a software-defined networking (SDN) system.

* * * * *